US009899668B2

(12) United States Patent
Kim

(10) Patent No.: US 9,899,668 B2
(45) Date of Patent: Feb. 20, 2018

(54) METHOD OF PREPARING POSITIVE ACTIVE MATERIAL FOR RECHARGEABLE LITHIUM BATTERY, POSITIVE ACTIVE MATERIAL FOR RECHARGEABLE LITHIUM BATTERY PREPARED BY METHOD, AND RECHARGEABLE LITHIUM BATTERY INCLUDING SAME

(71) Applicant: SAMSUNG SDI CO., LTD., Yongin-si, Gyeonggi-do (KR)

(72) Inventor: Ji-Hyun Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 764 days.

(21) Appl. No.: 13/955,630

(22) Filed: Jul. 31, 2013

(65) Prior Publication Data
US 2014/0099548 A1    Apr. 10, 2014

(30) Foreign Application Priority Data

Oct. 5, 2012 (KR) .................. 10-2012-0110745

(51) Int. Cl.
*H01M 4/36* (2006.01)
*H01M 4/58* (2010.01)
(Continued)

(52) U.S. Cl.
CPC ............. *H01M 4/364* (2013.01); *C01B 25/45* (2013.01); *H01M 4/0471* (2013.01);
(Continued)

(58) Field of Classification Search
CPC ........................................... H01M 4/00–4/608
See application file for complete search history.

(56) References Cited

U.S. PATENT DOCUMENTS 6,187,942 B1 * 2/2001 Patel ..................... C07C 68/005
502/338
2006/0204848 A1 * 9/2006 Franger .................. C01B 25/45
429/231.1
(Continued)

FOREIGN PATENT DOCUMENTS

JP        2003-292309 A     10/2003
JP        2005-116392 A     4/2005
(Continued)

OTHER PUBLICATIONS

Gandrud, K. B., Pettersen, A., Nilsen, O., & Fjellvåg, H. (2013). High-performing iron phosphate for enhanced lithium ion solid state batteries as grown by atomic layer deposition. Journal of Materials Chemistry A, 1(32), 9054-9059. (Jun. 18, 2013).*
(Continued)

*Primary Examiner* — Jonathan Crepeau
*Assistant Examiner* — Jacob Buchanan
(74) *Attorney, Agent, or Firm* — Robert E. Bushnell, Esq.

(57) ABSTRACT

Disclosed is a method of preparing a positive active material for a rechargeable lithium battery that includes mixing an iron source including a carbon source, a lithium source, and a phosphoric acid source to form a positive active material precursor for a rechargeable lithium battery, the positive active material precursor including a lithium iron phosphate precursor and a carbon precursor; pulverizing the positive active material precursor for a rechargeable lithium battery; and heat-treating the pulverized positive active material precursor for a rechargeable lithium battery.

15 Claims, 5 Drawing Sheets

(51) Int. Cl.
    *H01M 4/04*     (2006.01)
    *H01M 4/1397*     (2010.01)
    *C01B 25/45*     (2006.01)
    *H01M 4/136*     (2010.01)
    *H01M 4/62*     (2006.01)

(52) U.S. Cl.
    CPC ......... *H01M 4/136* (2013.01); *H01M 4/1397* (2013.01); *H01M 4/366* (2013.01); *H01M 4/5825* (2013.01); *H01M 4/625* (2013.01)

(56) References Cited

U.S. PATENT DOCUMENTS

| | | | |
|---|---|---|---|
| 2010/0117033 A1* | 5/2010 | Guo | H01G 9/2027 252/507 |
| 2011/0091772 A1 | 4/2011 | Mishima et al. | |
| 2012/0064408 A1 | 3/2012 | Song et al. | |
| 2012/0082922 A1* | 4/2012 | Yamaki | H01M 4/02 429/532 |
| 2012/0135309 A1 | 5/2012 | Kim | |
| 2012/0168686 A1* | 7/2012 | Metz | B82Y 30/00 252/506 |

FOREIGN PATENT DOCUMENTS

| | | |
|---|---|---|
| JP | 2009-263222 A | 11/2009 |
| JP | 2011210376 A | 10/2011 |
| KR | 10-0834054 B1 | 5/2008 |
| KR | 1020120026822 A | 3/2012 |
| KR | 1020120056675 A | 6/2012 |
| WO | WO 2012023904 A1 * | 2/2012 ......... H01M 10/052 |

OTHER PUBLICATIONS

Hamid, N. A., Wennig, S., Hardt, S., Heinzel, A., Schulz, C., & Wiggers, H. (2012). High-capacity cathodes for lithium-ion batteries from nanostructured LiFePO 4 synthesized by highly-flexible and scalable flame spray pyrolysis.Journal of Power Sources, 216, 76-83. (May 24, 2012).*

Korean Office Action issued by the Korean Patent Office dated Aug. 31, 2016 of the corresponding to Korean patent Application No. 10-2012-0110745 and Request for Entry of the Accompanying Office Action attached herewith.

Notice of Allowance by Korean Patent Office dated Mar. 24, 2017 in connection with Korean Application No. 10-2012-0110745 and Request for Entry of the Accompanying Office Action attached herewith.

* cited by examiner

METHOD OF PREPARING POSITIVE ACTIVE MATERIAL FOR RECHARGEABLE LITHIUM BATTERY, POSITIVE ACTIVE MATERIAL FOR RECHARGEABLE LITHIUM BATTERY PREPARED BY METHOD, AND RECHARGEABLE LITHIUM BATTERY INCLUDING SAME

CLAIM PRIORITY

This application makes reference to, incorporates the same herein, and claims all benefits accruing under 35 U.S.C. § 119 from an application for METHOD OF PREPARING POSITIVE ACTIVE MATERIAL FOR RECHARGEABLE LITHIUM BATTERY, POSITIVE ACTIVE MATERIAL FOR RECHARGEABLE LITHIUM BATTERY PREPARED BY METHOD, AND RECHARGEABLE LITHIUM BATTERY INCLUDING SAME earlier filed in the Korean Intellectual Property Office on 5 Oct. 2012 and there duly assigned Serial No. 10-2012-0110745.

BACKGROUND OF THE INVENTION

Filed of the Invention

This disclosure relates to a method of preparing a positive active material for a rechargeable lithium battery, a positive active material for a rechargeable lithium battery prepared using the method, and a rechargeable lithium battery including the same.

Description of the Related Art

Batteries generate electric power by using materials capable of electrochemical reactions at positive and negative electrodes. For example, a rechargeable lithium battery generates electricity due to change of chemical potentials when lithium ions are intercalated/deintercalated at positive and negative electrodes.

The rechargeable lithium battery includes a material that can reversibly intercalate/deintercalate lithium ions as positive and negative active materials and also includes an organic electrolyte solution or a polymer electrolyte charged between the positive and negative electrodes.

A negative active material for a rechargeable lithium battery has included various carbon-based materials such as artificial graphite, natural graphite, hard carbon, and the like, which can all intercalate and deintercalate lithium ions.

As for positive active materials of a rechargeable lithium battery, there has been research on lithium-transition element composite oxides that can intercalate lithium, such as $LiCoO_2$, $LiMn_2O_4$, $LiNiO_2$, $LiNi_{1-x}Co_xO_2$ (0<x<1), $LiMnO_2$, $LiFePO_4$, and the like. In particular, $LiFePO_4$ has high energy density and stability, has low cost, and is environment-friendly.

SUMMARY OF THE INVENTION

One exemplary embodiment of the present invention provides a method of preparing a positive active material for a rechargeable lithium battery that makes use of an iron source including a carbon source. The method exhibits decreased manufacturing time and excellent economy.

Another embodiment of the present invention provides a positive active material for a rechargeable lithium battery having excellent charging/discharging rate and capacity characteristics. The positive active material for a rechargeable lithium battery is prepared by forming carbon on the surface of lithium iron phosphate.

Yet another embodiment of the present invention provides a rechargeable lithium battery including the positive active material.

A method of preparing a positive active material for a rechargeable lithium battery according to one embodiment of the invention includes mixing an iron source including a carbon source, a lithium source, and a phosphoric acid source to form a positive active material precursor for a rechargeable lithium battery, the positive active material precursor including a lithium iron phosphate precursor including a compound represented by the following Chemical Formula 1 and a carbon precursor; and heat-treating the mixed positive active material precursor for a rechargeable lithium battery.

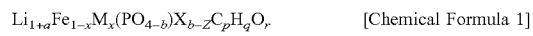

$Li_{1+a}Fe_{1-x}M_x(PO_{4-b})X_{b-z}C_pH_qO_r$     [Chemical Formula 1]

In Chemical Formula 1,

M is Al, Mg, Ni, Co, Mn, Ti, Ga, Cu, V, Nb, Zr, Ce, In, Zn, Y, or a combination thereof, X is F, S, N, or a combination thereof, −0.5≤a≤0.5, 0≤x≤0.5, 0≤b≤0.1, 1≤p≤100, 1≤q≤100, 1≤r≤100, and 0≤z≤50.

The positive active material for a rechargeable lithium battery may include a particle including lithium iron phosphate as represented by the following Chemical Formula 2; carbon may be present on the surface of the particle.

$Li_{1+a}Fe_{1-x}M_x(PO_{4-b})X_b$     [Chemical Formula 2]

In Chemical Formula 2,

M is Al, Mg, Ni, Co, Mn, Ti, Ga, Cu, V, Nb, Zr, Ce, In, Zn, Y, or a combination thereof, X is F, S, N, or a combination thereof, −0.5≤a≤0.5, 0≤x≤0.5, and 0≤b≤0.1.

Specifically, the lithium iron phosphate represented by the above Chemical Formula 2 may be $LiFePO_4$.

Carbon may be coated on a part or whole of the surface of the particle including the lithium iron phosphate and represented by the above Chemical Formula 2.

In the method of preparing a positive active material for a rechargeable lithium battery, the iron source including a carbon source may include the carbon and the iron at a weight ratio of from about 1:1 to about 3:1, respectively.

The iron source including a carbon source may include a compound represented by the following Chemical Formula 3, a compound represented by the following Chemical Formula 4, or a combination thereof

[Chemical Formula 3]

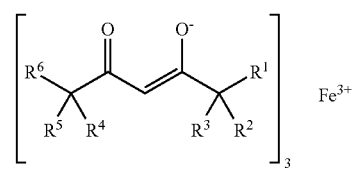

In Chemical Formula 3, $R^1$ to $R^6$ are the same or different and are independently hydrogen, or a substituted or unsubstituted C1 to C30 aliphatic organic group,

[Chemical Formula 4]

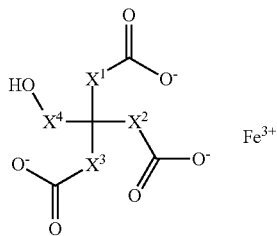

In Chemical Formula 4, $X^1$ to $X^4$ are the same or different and are independently a single bond, or a substituted or unsubstituted divalent C1 to C30 aliphatic organic group.

Specifically, the iron source including a carbon source may include a compound represented by the following Chemical Formula 5, a compound represented by the following Chemical Formula 6, or a combination thereof.

[Chemical Formula 5]

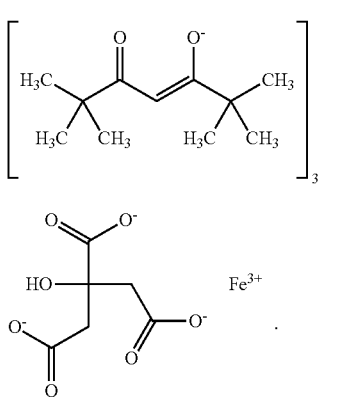

[Chemical Formula 6]

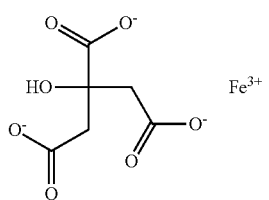

The lithium source may include lithium hydroxide monohydrate ($LiOH \cdot H_2O$), $Li_2CO_3$, $Li_3PO_4$, $LiNO_3$, or a combination thereof.

The phosphoric acid source may include phosphoric acid ($H_3PO_4$), $(NH_4)_2HPO_4$, $(NH_4)H_2PO_4$, $Li_3PO_4$, or a combination thereof.

During formation of the positive active material precursor for a rechargeable lithium battery, from about 40 wt % to about 90 wt % of the iron source including a carbon source, from about 2 wt % to about 20 wt % of the lithium source, and from about 5 wt % to about 40 wt % of the phosphoric acid source may be mixed.

The heat-treating may be performed under an inert atmosphere or a reducing atmosphere.

The heat-treating may be performed at a temperature from about 600° C. to about 850° C.

The method further includes pulverizing the positive active material precursor, after the mixing and before the heat-treating.

According to another embodiment of the present invention, a positive active material for a rechargeable lithium battery prepared according to the method of preparing a positive active material for a rechargeable lithium battery is provided.

According to yet another embodiment of the present invention, a rechargeable lithium battery including a positive electrode including the positive active material, a negative electrode including a negative active material, and an electrolyte is provided.

Hereinafter, further embodiments of this disclosure will be described in detail.

According to one embodiment of the present invention, a method of preparing a positive active material for a rechargeable lithium battery uses an iron source including a carbon source and exhibits a decreased manufacturing time and excellent economy. In addition, the method provides a positive active material for a rechargeable lithium battery including carbon uniformly formed on the surface thereof. This arrangement allows for excellent charging/discharging rates and excellent capacity characteristics.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
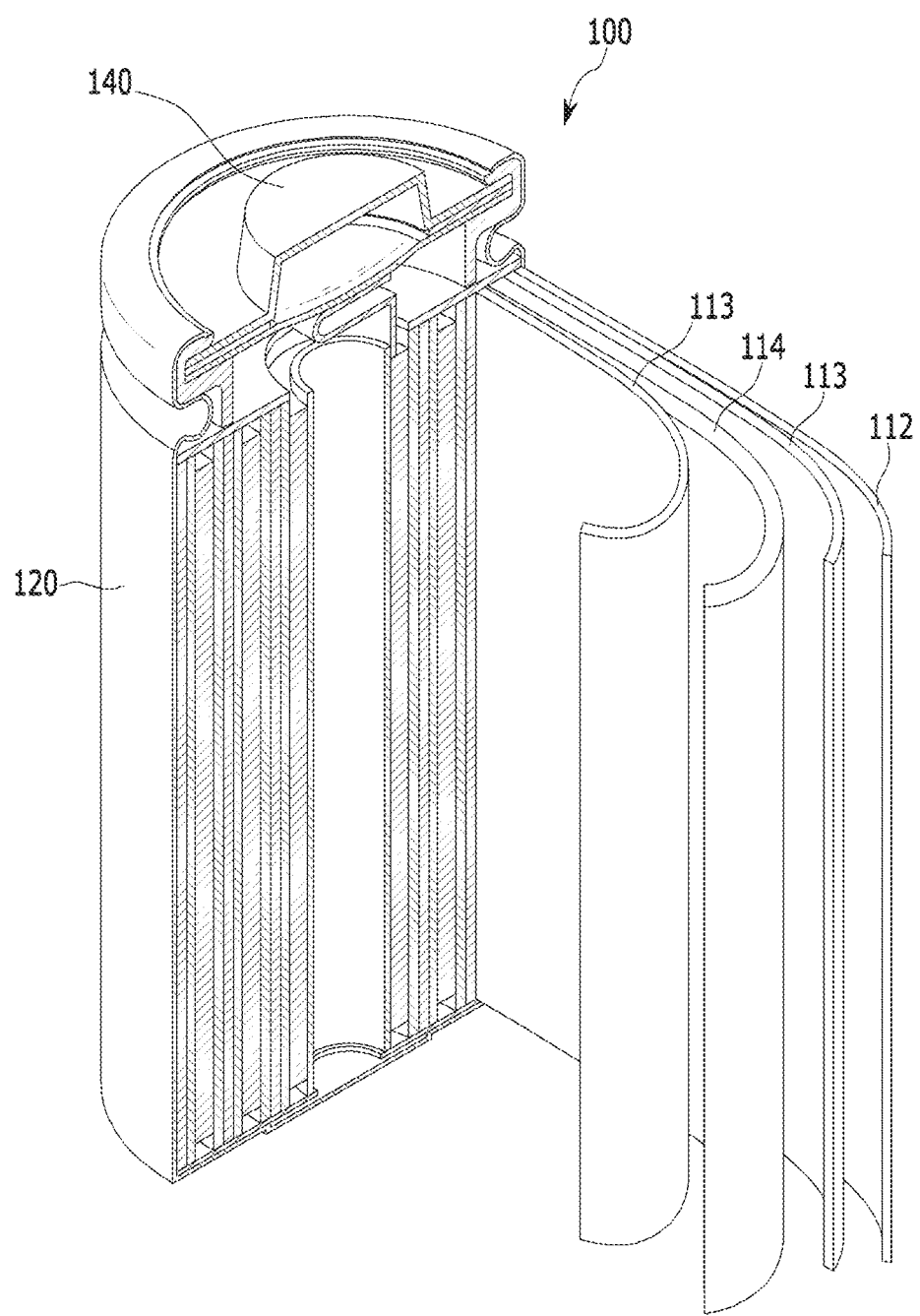
FIG. 1 is a schematic view showing a rechargeable lithium battery according to one embodiment.

Exemplary embodiments of the present invention will hereinafter be described in detail referring to the following accompanied drawings and can be easily performed by those who have common knowledge in the related art. However, these embodiments are only exemplary, and the present invention is not limited thereto.

As used herein, when other specific definition is not otherwise provided, the term "substituted" may refer to a functional group substituted with at least one substituent selected from a halogen (F, Cl, Br, or I), a hydroxyl group, a nitro group, a cyano group, an amino group (—$NH_2$, —$NH(R^{100})$, or —$N(R^{101})(R^{102})$, (wherein $R^{100}$, $R^{101}$, and $R^{102}$ are the same or different and independently a C1 to C10 alkyl group), an amidino group, a hydrazine group, a hydrazine group, a carboxyl group, a substituted or unsubstituted alkyl group, a substituted or unsubstituted haloalkyl group, a substituted or unsubstituted alkoxy group, a substituted or unsubstituted alkenyl group, and a substituted or unsubstituted alkynyl group.

As used herein, when other specific definition is not otherwise provided, the term "alkyl group" refers to a C1 to C30 alkyl, and specifically a C1 to C20 alkyl group, the term "alkylene group" refers to a C1 to C30 alkylene group, and specifically a C1 to C20 alkylene group, the term "alkoxy group" refers to a C1 to C30 alkoxy group, and specifically a C1 to C20 alkoxy group, and the term "halogen" refers to F, Cl, Br, or I.

As used herein, when other specific definition is not otherwise provided, the term "aliphatic" refers to C1 to C30 alkyl, C2 to C30 alkenyl, C2 to C30 alkynyl, C1 to C30 alkylene, C2 to C30 alkenylene, or C2 to C30 alkynylene, specifically C1 to C20 alkyl, C2 to C20 alkenyl, C2 to C20 alkynyl, C1 to C20 alkylene, C2 to C20 alkenylene, or C2 to C20 alkynylene, and more specifically C1 to C10 an alkyl, C2 to C10 alkenyl, C2 to C10 alkynyl, C1 to C10 alkylene, C2 to C10 alkenylene, or C2 to C10 alkynylene.

In the drawings, the thicknesses of layers, films, panels, regions, etc., are exaggerated for clarity. Throughout the present specification, like reference numerals designate like elements.

It will be understood that when an element such as a layer, a film, a region, or a substrate is referred to as being "on" another element, it may be directly on the other element, or intervening elements may also be present. In contrast, when an element is referred to as being "directly on" another element, there are no intervening elements present.

According to one embodiment of the present invention, provided is a method of preparing a positive active material for a rechargeable lithium battery that includes mixing an iron source including a carbon source, a lithium source, and a phosphoric acid source to form a positive active material precursor for a rechargeable lithium battery, the positive active material precursor including a lithium iron phosphate precursor, the lithium iron phosphate precursor including a compound represented by the following Chemical Formula 1, the positive active material precursor further including a carbon precursor; and heat-treating the mixed positive active material precursor for a rechargeable lithium battery.

$Li_{1+a}Fe_{1-x}M_x(PO_{4-b})X_{b-z}C_pH_qO_r$     [Chemical Formula 1]

In Chemical Formula 1,

M is Al, Mg, Ni, Co, Mn, Ti, Ga, Cu, V, Nb, Zr, Ce, In, Zn, Y, or a combination thereof, X is F, S, N, or a combination thereof, $-0.5 \leq a \leq 0.5$, $0 \leq x \leq 0.5$, $0 \leq b \leq 0.1$, $1 \leq p \leq 100$, $1 \leq q \leq 100$, $1 \leq r \leq 100$, and $0 \leq z \leq 50$.

According to one embodiment of the present invention, the method provides a positive active material for a rechargeable lithium battery using an iron source including a carbon source. The method may provide for decreased manufacturing cost and simplified manufacturing processes. In addition, the method may uniformly form carbon on the surface of the positive active material for a rechargeable lithium battery and improve charging/discharging rates and capacity characteristics thereof.

A positive active material for a rechargeable lithium battery prepared according to the method of the present invention for preparing a positive active material for a rechargeable lithium battery may include a particle, the particle including lithium iron phosphate, the lithium iron phosphate being represented by the following Chemical Formula 2; and carbon present on the surface of the particle.

$Li_{1+a}Fe_{1-x}M_x(PO_{4-b})X_b$     [Chemical Formula 2]

In Chemical Formula 2,

M is Al, Mg, Ni, Co, Mn, Ti, Ga, Cu, V, Nb, Zr, Ce, In, Zn, Y, or a combination thereof, X is F, S, N, or a combination thereof, $-0.5 \leq a \leq 0.5$, $0 \leq x \leq 0.5$, and $0 \leq b \leq 0.1$.

The positive active material for a rechargeable lithium battery includes lithium iron phosphate particles represented by the above Chemical Formula 2 and thus may effectively intercalate and deintercalate lithium ions and improve stability.

The positive active material for a rechargeable lithium battery includes carbon on the surface of the lithium iron phosphate particles, the lithium iron phosphate particles being represented by the above Chemical Formula 2, and the positive active material may accordingly show improved charging/discharging rates and improved capacity characteristics.

Specifically, the lithium iron phosphate represented by the above Chemical Formula 2 may be $LiFePO_4$, but is not limited thereto.

The carbon may be coated on a part or whole of the surface of the particle including the lithium iron phosphate represented by the above Chemical Formula 2.

In the method of preparing a positive active material for a rechargeable lithium battery, the iron source including a carbon source may include the carbon and the iron at a weight ratio of from about 1:1 to about 3:1, respectively. In the iron source including a carbon source, when carbon and iron are included within the weight ratio range, carbon is effectively attached on the surface of the lithium iron phosphate particles and may exhibit improved electrical conductivity. Specifically, the iron source including a carbon source may include the carbon and the iron in a weight ratio ranging from about 1.2:1 to about 2.6:1.

The iron source including a carbon source may include a compound represented by the following Chemical Formula 3, a compound represented by the following Chemical Formula 4, or a combination thereof, but is not limited thereto.

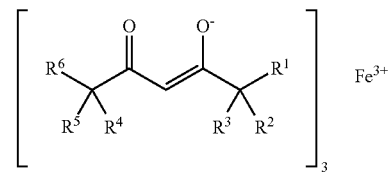

[Chemical Formula 3]

In Chemical Formula 3, $R^1$ to $R^6$ are the same or different and are independently hydrogen, or a substituted or unsubstituted C1 to C30 aliphatic organic group, specifically a substituted or unsubstituted C1 to C20 aliphatic organic group, and more specifically a substituted or unsubstituted C1 to C10 aliphatic organic group.

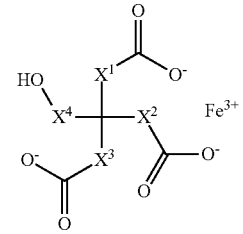

[Chemical Formula 4]

In Chemical Formula 4, $X^1$ to $X^4$ are the same or different and are independently a single bond, or a substituted or unsubstituted divalent C1 to C30 aliphatic organic group, specifically a substituted or unsubstituted divalent C1 to C20 aliphatic organic group, and more specifically a substituted or unsubstituted divalent C1 to C10 aliphatic organic group.

Specifically, the iron source including a carbon source may include a compound represented by the following Chemical Formula 5, a compound represented by the following Chemical Formula 6, or a combination thereof, but is not limited thereto.

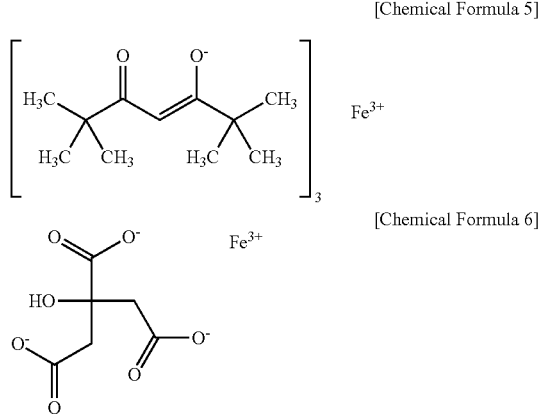

[Chemical Formula 5]

[Chemical Formula 6]

The lithium source may include lithium hydroxide 1 hydrate (LiOH.H$_2$O), Li$_2$CO$_3$, Li$_3$PO$_4$, LiNO$_3$, or a combination thereof, but is not limited thereto.

The phosphoric acid source may include phosphoric acid (H$_3$PO$_4$), (NH$_4$)$_2$HPO$_4$, (NH$_4$)H$_2$PO$_4$, Li$_3$PO$_4$, or a combination thereof, but is not limited thereto.

During formation of the positive active material precursor for a rechargeable lithium battery, from about 40 wt % to about 90 wt % of the iron source including a carbon source, from about 2 wt % to about 20 wt % of the lithium source, and from about 5 wt % to about 40 wt % of the phosphoric acid source may be mixed. When these components are mixed, each component being within the corresponding aforementioned range, the positive active material precursor for a rechargeable lithium battery may be effectively prepared. Specifically, from about 50 wt % to about 80 wt % of the iron source including a carbon source, from about 4 wt % to about 15 wt % of the lithium source, and from about 15 wt % to about 35 wt % of the phosphoric acid source may be mixed The iron source including a carbon source, the lithium source, and the phosphoric acid source may be mixed via a mechanical method, a ball milling method, a wet mixing method, or a combination thereof, but the mode of mixing is not limited thereto.

The mixing of an iron source including a carbon source, a lithium source, and a phosphoric acid source may be performed in a solvent or in a solvent-free (i.e. without solvent). The solvent may be water, or alcohol such as methanol, ethanol, isopropyl alcohol, a combination thereof.

The lithium iron phosphate precursor including the compound represented by the above Chemical Formula 1 may be prepared by reaction of iron in the iron source including a carbon source, lithium in the lithium source, and phosphoric acid in the phosphoric acid source. In addition, the carbon precursor may be formed from a carbon component in the iron source including a carbon source.

During the mixing, the positive active material may be simultaneously pulverized. Alternatively, the positive active material precursor for a rechargeable lithium battery may be additionally pulverized in a method of ball milling, crushing, mechanofusion, or a combination thereof but is not limited thereto.

During heat-treatment of the pulverized positive active material precursor for a rechargeable lithium battery, the heat-treating may be performed under an inert atmosphere, a reducing atmosphere, or a combination thereof. Specifically, the inert atmosphere may include an argon (Ar) atmosphere or a nitrogen (N$_2$) atmosphere, and the reducing atmosphere may be a hydrogen (H$_2$) atmosphere, but is not limited thereto.

The heat-treatment may be performed at a temperature of from about 600° C. to about 850° C. The heat-treatment may be performed within this temperature range for from about 2 hours to about 20 hours using an increasing temperature gradient of about 0.5° C./min-5° C./min. When the heat-treatment is performed under the above conditions, the lithium source is decomposed and sufficiently diffuses lithium throughout the positive active material precursor and may effectively form a positive active material for a rechargeable lithium battery. In other words, according to the heat treatment, a reaction of a lithium iron phosphate precursor represented by the above Chemical Formula 1 occurs, lithium iron phosphate particles having one composition may be readily prepared, and carbon coating may be effectively formed on the surface of the lithium iron phosphate particles. Specifically, the heat-treatment may be performed at a temperature of from about 650° C. to about 750° C.

In the embodiment a drying may additionally performed after mixing and before heat-treating. The drying may be performed at about 100° C. to about 230° C. for about 1 hour to about 10 hours using an oven or a spray dryer.

Accordingly, the method may provide a positive active material for a rechargeable lithium battery according to one embodiment of the present invention.

The positive active material for a rechargeable lithium battery may be usefully applied to a positive electrode for an electrochemical cell such as a rechargeable lithium battery. The rechargeable lithium battery includes a negative electrode including a negative active material and an electrolyte as well as the positive electrode.

The positive electrode may include a current collector and a positive active material layer on the current collector.

The positive active material layer may include a binder and a conductive material.

The function of the binder is to improve binding properties of the positive active material particles to each other and to a current collector. Examples of materials useful as binders include polyvinylalcohol, carboxylmethylcellulose, hydroxypropylcellulose, diacetylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, a styrene-butadiene rubber, a styrene-butadiene acrylate rubber, an epoxy resin, nylon, and the like, but are not limited thereto.

The conductive material is included to improve electrode conductivity. Any electrically conductive material may be used as the conductive material component of the positive active material layer unless it causes a chemical change. Examples of materials useful as the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive a polymer such as polyphenylene derivative; or a combination thereof, but is not limited thereto.

The current collector may be Al but is not limited thereto.

The negative electrode includes a current collector and a negative active material layer formed on the current collector, and the negative active material layer includes a negative active material.

The negative active material includes a material that reversibly intercalates/deintercalates lithium ions, a lithium metal, a lithium metal alloy, a material capable of doping/dedoping lithium, a transition metal oxide, or a combination thereof.

The material that can reversibly intercalate/deintercalate lithium ions may include a carbon material. Examples of carbon materials useful in this role include crystalline carbon, amorphous carbon, and mixtures thereof. The crystalline carbon may be shapeless, sheet, flake, spherical, or fiber-shaped natural graphite or artificial graphite. The amorphous carbon may be one of a soft carbon, a hard carbon, a mesophase pitch carbonization product, fired coke, and the like.

Examples of the lithium metal alloy useful as a component of the negative active material include lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium and being useful as a component of the negative active material may include one of Si, $SiO_x$ (0<x<2), a Si-M alloy (M being selected from an alkali metal, an alkaline-earth metal, Group 13 to Group 16 elements, a transition element, a rare earth element, and a combination thereof, and not Si), Sn, $SnO_2$, a Sn-Q alloy (Q being selected from an alkali metal, an alkaline-earth metal, Group 13 to Group 16 elements, a transition element, a rare earth element, and a combination thereof, and not Sn), and the like, and at least one thereof may be mixed with $SiO_2$. The M and Q may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide useful as a component of the negative active material include vanadium oxide, lithium vanadium oxide, and the like.

The negative active material layer may include a binder and, optionally, a conductive material.

The binder improves binding properties of negative active material particles with one another and with a current collector. Examples of materials useful as the binder include polyvinylalcohol, carboxylmethylcellulose, hydroxypropylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, a styrene-butadiene rubber, acrylated styrene-butadiene rubbers, epoxy resins, nylon, and the like, but are not limited thereto.

The conductive material is included to improve electrode conductivity. Any electrically conductive material may be used as a conductive material component of the negative active material layer unless it causes a chemical change. Examples of materials useful as the conductive material include carbon-based materials such as natural graphite, artificial graphite, carbon black, acetylene black, ketjen black, a carbon fiber, and the like; metal-based materials of metal powder or metal fiber including copper, nickel, aluminum, silver, and the like; or conductive polymers such as polyphenylene derivatives, but are not limited thereto.

The current collector may include a copper foil, a nickel foil, a stainless steel foil, a titanium foil, a nickel foam, a copper foam, a polymer substrate coated with a conductive metal, and combinations thereof, but is not limited thereto.

The positive electrode and negative electrode may be manufactured by a method including mixing an active material, a conductive material, and a binder to prepare an active material composition and coating the composition onto a current collector. The electrode manufacturing method is well known and thus is not described in detail in the present specification. The solvent can be N-methylpyrrolidone, but it is not limited thereto.

An electrolyte useful for filling the rechargeable lithium battery may be a non-aqueous electrolyte or a solid electrolyte, the electrolyte having a lithium salt dissolved therein.

The solvent may include one of a carbonate-based, ester-based, ether-based, ketone-based, alcohol-based, and an aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, dimethylacetate, methylpropinonate, ethylpropinonate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone and the like. The alcohol-based solvent may include ethanol, isopropyl alcohol, and the like, and the aprotic solvent may include nitriles such as R—CN (where R is a C2 to C20 linear, branched, or cyclic hydrocarbon group including a double bond, an aromatic ring, or an ether bond), amides such as dimethylformamide, dioxolanes such as 1,3-dioxolane, sulfolanes, and the like.

The solvent may be used singularly or in a mixture. When the organic solvent is used in a mixture, the mixture ratio may be controlled in accordance with a desirable battery performance.

The carbonate-based solvent may be prepared by mixing a cyclic carbonate and a linear carbonate. The cyclic carbonate and the linear carbonate are mixed together in a volume ratio ranging from about 1:1 to about 1:9. When the mixture is used as an electrolyte, the electrolyte performance may be enhanced.

In addition, the solvent may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be an aromatic hydrocarbon-based compound represented by the following Chemical Formula 7.

[Chemical Formula 7]

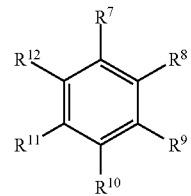

In Chemical Formula 7, $R^7$ to $R^{12}$ are the same or different and are independently selected from hydrogen, a halogen, a C1 to C10 alkyl group, and a C1 to C10 haloalkyl group.

The aromatic hydrocarbon-based solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include an additive of vinylene carbonate, an ethylene carbonate-based compound represented by the following Chemical Formula 8, or a combination thereof to improve cycle life.

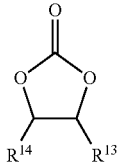

[Chemical Formula 8]

In Chemical Formula 8, $R^{12}$ and $R^{13}$ are the same or different and are independently selected from hydrogen, a halogen, a cyano group (CN), a nitro group ($NO_2$), and a C1 to C5 fluoroalkyl group, provided that at least one of $R^7$ and $R^8$ is selected from a halogen, a cyano group (CN), a nitro group ($NO_2$), and a C1 to C5 fluoroalkyl group.

Examples of the ethylene carbonate-based compound useful as a component of the non-aqueous electrolyte include difluoroethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The electrolyte may include a gel-type polymer electrolyte prepared by impregnating an electrolyte solution in a polymer electrolyte such as polyethyleneoxide, polyacrylonitrile, and the like, and may include an inorganic solid electrolyte such as LiI and $Li_3N$, but is not limited thereto.

The lithium salt is dissolved in an organic solvent and plays a role of supplying lithium ions in a battery, supporting basic operations of the rechargeable lithium battery and improving lithium ion transportation between positive and negative electrodes therein. The lithium salt may include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, LiN $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate; LiBOB), and a combination thereof. The lithium salt may be used at a concentration ranging from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between a negative electrode and a positive electrode, as needed. The separator materials include polyethylene, polypropylene, and polyvinylidene fluoride, and a multi-layer thereof. For example, a polyethylene/polypropylene double-layered separator, a polyethylene/polypropylene/polyethylene triple-layered separator, and a polypropylene/polyethylene/polypropylene triple-layered separator may be used.

Rechargeable lithium batteries may be classified as lithium ion batteries, lithium ion polymer batteries, and lithium polymer batteries according to the presence of a separator and the kind of electrolyte used therein. The rechargeable lithium batteries may have a variety of shapes and sizes, may include cylindrical, prismatic, coin, or pouch-type batteries, and may be thin film batteries or may be rather bulky in size. Structures and fabricating methods for lithium ion batteries pertaining to the present invention are well known in the art.

FIG. 1 is a schematic view of a rechargeable lithium battery according to one embodiment of the present invention. As shown in FIG. 1, the rechargeable lithium battery 100 includes a negative electrode 112, a positive electrode 114, and a separator 113 interposed between the negative electrode 112 and the positive electrode 114, an electrolyte (not shown) impregnated in the negative electrode 112, the positive electrode 114, and the separator 113, and a sealing member 140 sealing the battery case 120. The rechargeable lithium battery of the present invention is not limited to the illustrated shape and may be of any shape such as one of a cylindrical battery, a coin-type battery, and a pouch-type battery.

The following examples illustrate the present invention in more detail. These examples, however, should not in any sense be interpreted as limiting the scope of the present invention.

EXAMPLES

Example 1

Preparation of Positive Active Material for Rechargeable Lithium Battery Cell

A quantity of 19.57 g of lithium phosphate ($Li_3PO_4$) a precursor of lithium and phosphate, and a quantity of 80.43 g of iron(III) tris(2,2,6,6-tetramethyl-3,5-heptanedionate), represented by Chemical Formula 5, were ball-milled for 10 hours using a ball and ethanol in a weight ratio of 30:1. The obtained ethanol slurry was slowly dried on a hot plate at about 70° C., obtaining powder. The dried powder was fired for 10 hours in a furnace at about 750° C. using an increasing temperature gradient of about 2° C./min, under a 5% $H_2$/95% $N_2$ atmosphere, preparing a positive active material.

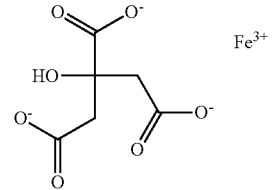

[Chemical Formula 6]

In the Chemical Formula 5, the weight ratio of carbon to iron was about 7.10:1.

Example 2

Preparation of Positive Active Material for Rechargeable Lithium Battery Cell

A quantity of 25.97 g of lithium phosphate ($LiPO_3$), a precursor of lithium and phosphate, and a quantity of 74.03 g of ferric citrate ($C_6H_5FeO_7$), represented by the following Chemical Formula 6, were ball-milled for 10 hours using a ball and ethanol in a weight ratio of 30:1. The obtained ethanol slurry was slowly dried on a hot plate at about 70° C., obtaining powder. The dried powder was fired for 10 hours in a furnace at about 750° C. using an increasing temperature gradient of about 2° C./min, under a 5% $H_2$/95% $N_2$ atmosphere, obtaining a positive active material.

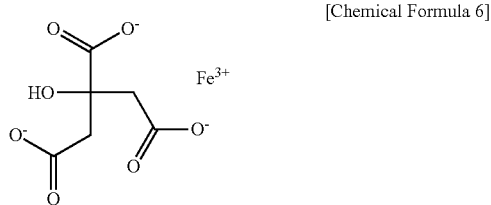

[Chemical Formula 6]

In the Chemical Formula 6, the weight ratio of carbon to iron was about 1.29:1.

Example 3

Fabrication of Rechargeable Lithium Battery Cell

The positive active material according to Example 1, Super-P® (TIMCAL Graphite & Carbon) as a conductive material, and polyvinylidene fluoride (PVdF) as a binder were respectively mixed in a weight ratio of 85:7.5:7.5 in N-methyl pyrrolidone, preparing a slurry. The slurry was uniformly coated on a 20 μm-thick aluminum foil and vacuum-dried at 120° C., fabricating a positive electrode.

The positive electrode was used with a lithium foil as a counter electrode, a porous polyethylene film (Celgard® 2300, thickness: 25 μm, Celgard LLC Co.) as a separator, and a liquid electrolyte solution prepared by mixing ethylene carbonate and ethylmethyl carbonate in a volume ratio of 3:7 and dissolving $LiPF_6$ in a concentration of 1.2 M therein in a conventional method, fabricating a coin half cell.

Example 4

Fabrication of Rechargeable Lithium Battery Cell

A coin half cell was fabricated according to the same method as Example 3 except for using the positive active material according to Example 2 instead of the positive active material according to Example 1.

Comparative Example 1

Preparation of Positive Active Material for Rechargeable Lithium Battery Cell

A quantity of 15.6 g of lithium carbonate, a quantity of 17.6 g of diammonium phosphate, and a quantity of 66.8 g of iron phosphate were ball-milled for 10 hours using a ball and ethanol in a weight ratio of 30:1. The obtained ethanol slurry was slowly dried on a hot plate at about 70° C., obtaining powder. The dried powder was mixed with 1.3 g of sucrose, and the mixture was fired for 10 hours in a furnace at about 750° C. under a 5% $H_2$/95% $N_2$ atmosphere, preparing a positive active material.

Comparative Example 2

Preparation of Positive Active Material for Rechargeable Lithium Battery Cell

A positive active material was fabricated according to the same method as Comparative Example 1 except for using the sucrose in an amount of 3.2 g instead of 1.3 g.

Comparative Example 3

Preparation of Positive Active Material for Rechargeable Lithium Battery Cell

A positive active material was fabricated according to the same method as Comparative Example 1 except for using the sucrose in an amount of 4.5 g instead of 1.3 g.

Comparative Example 4

Fabrication of Rechargeable Lithium Battery Cell

A coin half cell was fabricated according to the same method as Example 3 except for using the positive active material according to Comparative Example 1 instead of the one according to Example 1.

Comparative Example 5

Fabrication of Rechargeable Lithium Battery Cell

A coin half cell was fabricated according to the same method as Example 3 except for using the positive active material according to Comparative Example 2 instead of the one according to Example 1.

Comparative Example 6

Fabrication of Rechargeable Lithium Battery Cell

A coin half cell was fabricated according to the same method as Example 3 except for using the positive active material according to Comparative Example 3 instead of the one according to Example 1.

Experimental Example 1

X-ray Diffraction (XRD)

The positive active materials according to Examples 1 and 2 and Comparative Examples 1 to 3 were subjected to X-ray diffraction analysis. The X-ray diffraction analysis used a Cu—Kα emission line as a light source.

Figure 2:
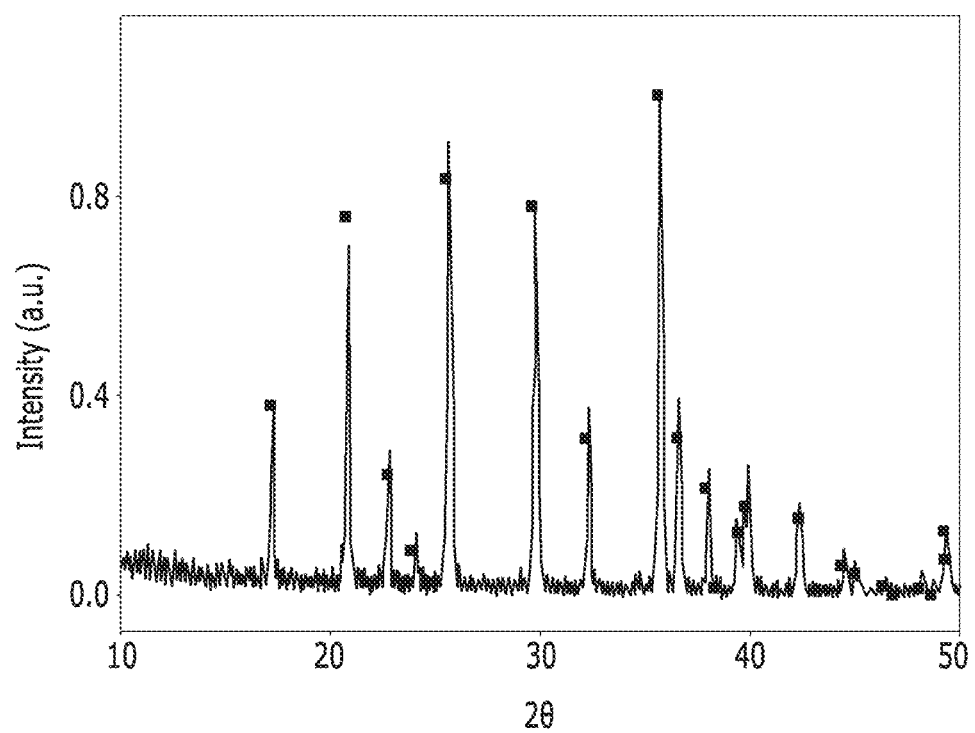
FIG. 2 is an X-ray diffraction analysis graph showing positive active materials according to Example 2 and Comparative Example 1.

Among these X-ray diffraction analysis results, the X-ray diffraction analysis graph according to Example 2 and Comparative Example 1 are provided in FIG. 2.

As shown in FIG. 2, the positive active materials for a rechargeable lithium battery according to Example 2 and Comparative Example 1 show a peak with an olivine structure and were identified to have a LiFePO$_4$ structure.

Experimental Example 2

FT-IR Measurement

For each positive active material according to Examples 1 and 2 and Comparative Examples 1 to 3, IR spectra in transmission and ATR modes were collected using Thermo Fisher scientific (Nicolet 6700) equipment.

Figure 3:
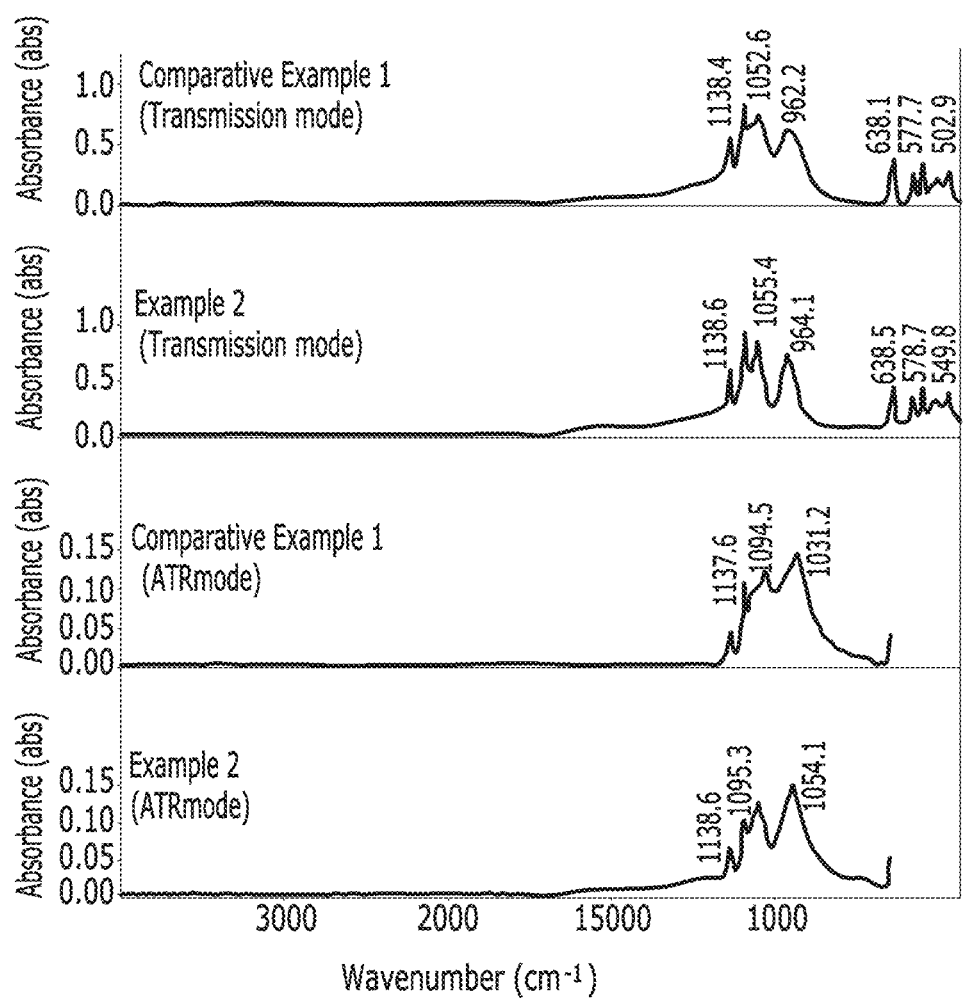
FIG. 3 is IR spectra showing the positive active materials according to Example 2 and Comparative Example 1.

FIG. 3 shows the IR spectra of the positive active materials according to Example 2 and Comparative Example 1.

As shown in FIG. 3, the positive active materials according to Example 2 and Comparative Example 1 had no —OH or —COO-group after carbonization of the carbon source, which shows that the carbon on the surface of the lithium iron phosphate according to Example 2 is same as that on the surface of the lithium iron phosphate according to Comparative Example 1.

Experimental Example 3

Transmission Electron Microscope (TEM) Photograph

The positive active materials according to Examples 1 and 2 and Comparative Examples 1 to 3 were deposited on a copper grid coated with carbon, fabricating a specimen. A TEM photograph of the cross-section of the specimen was taken using JEM-2000FX equipment made by Jeol Korea Ltd.

Figure 4:
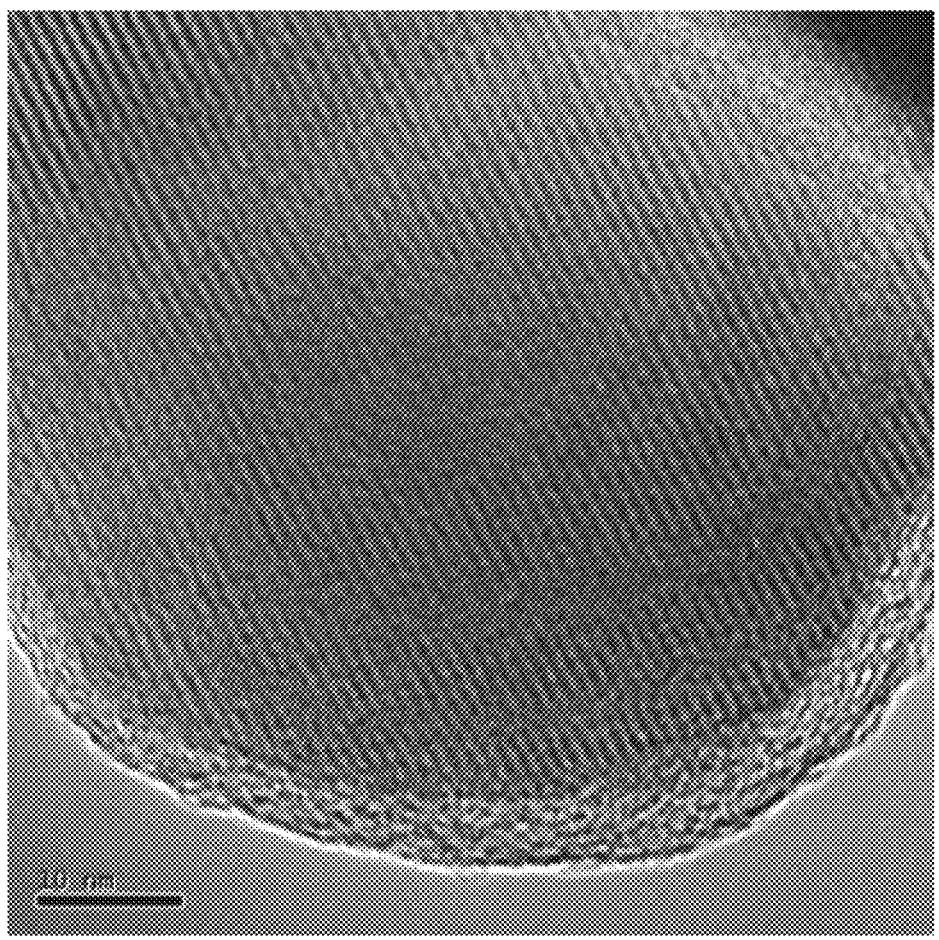
FIG. 4 is TEM photograph of the positive active material according to Example 2.
Figure 5:
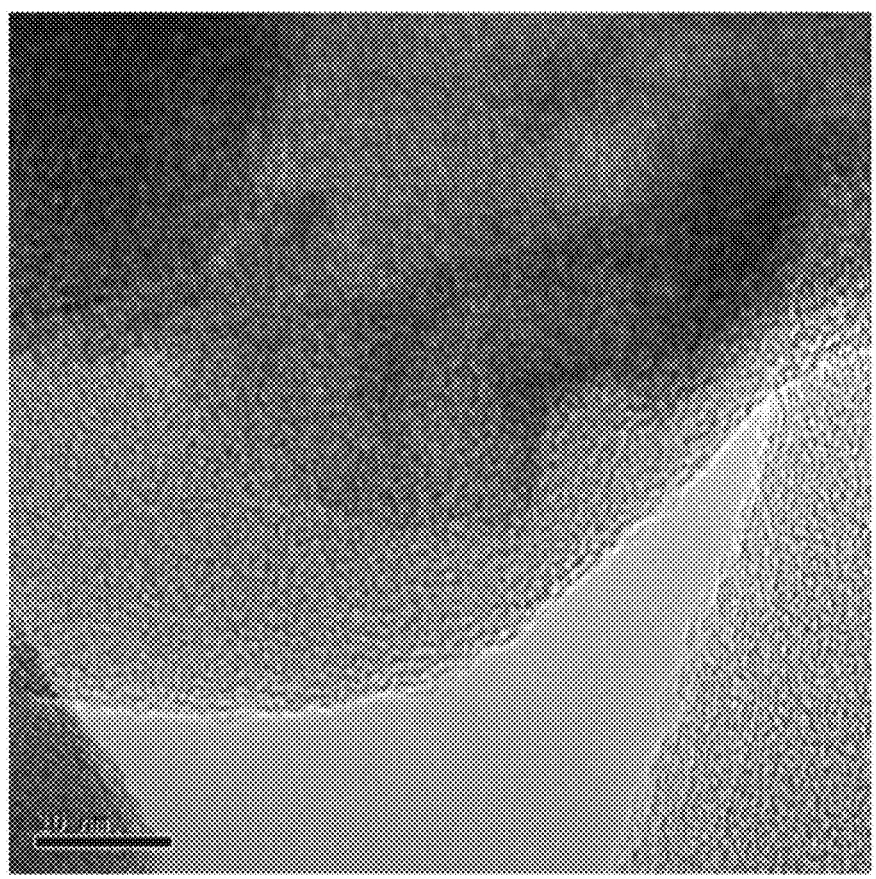
FIG. 5 is TEM photograph of the positive active material according to Comparative Example 1.

FIG. 4 provides the TEM photograph of the positive active material according to Example 2, and FIG. 5 is the TEM photograph of the positive active material according to Comparative Example 1.

Referring to FIG. 4, the positive active material according to Example 2 shows a uniformly thick carbon layer. On the other hand, as shown in FIG. 5, the positive active material according to Comparative Example 1 shows no uniformly-thick carbon layer.

The reason for this structural difference is that the positive active material according to Example 2 included a carbon source within an iron source and thus formed a uniformly thick carbon layer around a lithium iron phosphate molecule unit. Accordingly, the positive active material according to Example 2 provides a lithium rechargeable battery having excellent rate capability at high rates.

Experimental Example 4

Initial Charge Capacity, Initial Discharge Capacity, and Coulomb Efficiency The coin half cells according to Examples 3 and 4 and Comparative Examples 4 to 6 were respectively once charged and discharged at 30° C. and 2.7 V to 4.5 V with a 0.05 C-rate and measured regarding initial charge capacity, initial discharge capacity, and coulomb efficiency.

Experimental Example 5

Rate Capability

The coin half cells according to Examples 3 and 4 and Comparative Examples 4 to 6 were respectively once charged and discharged with a 0.1 C-rate, once charged and discharged with a 0.5 C-rate, charged with a 0.5 C-rate and discharged with a 1 C-rate, charged with a 0.5 C-rate and discharged with a 3 C-rate, charged with a 0.5 C-rate and discharged with a 5 C-rate and then measured to ascertain discharge capacity.

Each coin half cell according to Example 3 and 4 and Comparative Examples 4 and 6 was evaluated regarding discharge capacity based on 100% of discharge capacity of the coin half cell according to Comparative Example 5.

The results are provided in the following Table 1.

TABLE 1

|  | 0.1 C-rate charge 0.1 C-rate discharge (%) | 0.5 C-rate charge 0.5 C-rate discharge (%) | 0.5 C-rate charge & 1 C-rate discharge (%) | 0.5 C-rate charge & 3 C-rate discharge (%) | 0.5 C-rate charge & 5 C-rate discharge (%) |
| --- | --- | --- | --- | --- | --- |
| Example 3 | 100 | 101 | 106 | 112 | 114 |
| Example 4 | 100 | 101 | 106 | 110 | 113 |
| Comparative Example 4 | 100 | 101 | 100 | 99 | 98 |
| Comparative Example 5 | 100 | 100 | 100 | 100 | 100 |
| Comparative Example 6 | 100 | 96 | 95 | 94 | 95 |

Referring to Table 1, the rechargeable lithium battery cells according to Examples 3 and 4 show excellent high rate capability compared with the ones according to Comparative Examples 4 to 6.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of preparing a positive active material for a rechargeable lithium battery, comprising:

mixing an iron source including a carbon source, a lithium source, and a phosphoric acid source to form a positive active material precursor for a rechargeable lithium battery, the positive active material precursor including a lithium iron phosphate precursor, the lithium iron phosphate precursor including a compound represented by the following Chemical Formula 1 and a carbon precursor;

the iron source including a carbon source comprising a compound represented by the following Chemical Formula 3;

pulverizing the positive active material precursor for a rechargeable lithium battery during and simultaneously with the mixing; and heat-treating the mixed positive active material precursor for a rechargeable lithium battery:

$$Li_{1+a}Fe_{1-x}M_x(PO_{4-b})X_{b-z}C_pH_qO_r,$$ [Chemical Formula 1]

M being selected from Al, Mg, Ni, Co, Mn, Ti, Ga, Cu, V, Nb, Zr, Ce, In, Zn, Y, and a combination thereof, X being selected from F, S, N, and a combination thereof, $-0.5 < a \leq 0.5$, $0 \leq x \leq 0.5$, $0 \leq b \leq 0.1$, $1 \leq p \leq 100$, $1 \leq q \leq 100$, $1 \leq r \leq 100$, and $0 \leq z \leq 50$;

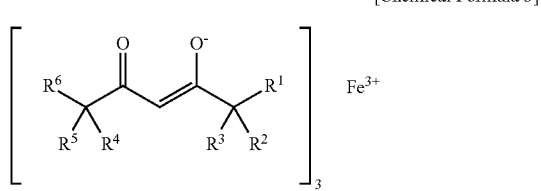
[Chemical Formula 3]

$R^1$ to $R^6$ being the same or different and being independently one of hydrogen, methyl, ethyl, n-propyl and isopropyl, where $R^1$ to $R^6$ are not all hydrogen.

2. The method of preparing a positive active material for a rechargeable lithium battery of claim 1, the positive active material for a rechargeable lithium battery comprising:

a particle, the particle including lithium iron phosphate, the lithium iron phosphate being represented by the following Chemical Formula 2; and carbon present on the surface of the particle:

$$Li_{1+a}Fe_{1-x}M_x(PO_{4-b})X_b$$ [Chemical Formula 2]

M being selected from Al, Mg, Ni, Co, Mn, Ti, Ga, Cu, V, Nb, Zr, Ce, In, Zn, Y, and a combination thereof, X being selected from F, S, N, and a combination thereof, $-0.5 < a \leq 0.5$, $0 \leq x \leq 0.5$, and $0 \leq b \leq 0.1$.

3. The method of preparing a positive active material for a rechargeable lithium battery of claim 2, the lithium iron phosphate represented by the above Chemical Formula 2 being $LiFePO_4$.

4. The method of preparing a positive active material for a rechargeable lithium battery of claim 2, the carbon being coated on a part or whole of the surface of the particle, the particle including the lithium iron phosphate represented by Chemical Formula 2.

5. The method of preparing a positive active material for a rechargeable lithium battery of claim 1, the lithium source comprising one of lithium hydroxide 1 hydrate ($LiOH.H_2O$), $Li_2CO_3$, $Li_3PO_4$, $LiNO_3$, and a combination thereof.

6. The method of preparing a positive active material for a rechargeable lithium battery of claim 1, the phosphoric acid source comprising one of phosphoric acid ($H_3PO_4$), $(NH_4)_2HPO_4$, $(NH_4)H_2PO_4$, $Li_3PO_4$, and a combination thereof.

7. The method of preparing a positive active material for a rechargeable lithium battery of claim 1, the method comprising mixing of from about 40 wt % to about 90 wt % of the iron source including a carbon source, from about 2 wt % to about 20 wt % of the lithium source, and from about 5 wt % to about 40 wt % of the phosphoric acid source.

8. The method of preparing a positive active material for a rechargeable lithium battery of claim 1, the heat-treating being performed under one of an inert atmosphere and a reducing atmosphere.

9. The method of preparing a positive active material for a rechargeable lithium battery of claim 1, the heat-treating being performed at a temperature of from about 600° C. to about 850° C.

10. The method of claim 1, the mixing step being carried out via a mechanical method, a ball milling method, a wet mixing method, or a combination thereof.

11. The method of claim 1, the mixing step being solvent free.

12. The method of claim 1, the positive active material precursor for a rechargeable lithium battery being additionally pulverized by means of ball milling, crushing, mechanofusion, or a combination thereof.

13. A positive active material for a rechargeable lithium battery prepared according to claim 1.

14. A rechargeable lithium battery, comprising
a positive electrode including a positive active material;
a negative electrode including a negative active material; and
an electrolyte,
the positive active material comprising the positive active material for a rechargeable lithium battery according to claim 13.

15. A method of preparing a positive active material for a rechargeable lithium battery, comprising:

mixing an iron source including a carbon source, a lithium source, and a phosphoric acid source to form a positive active material precursor for a rechargeable lithium battery, the positive active material precursor including a lithium iron phosphate precursor, the lithium iron phosphate precursor including a compound represented by the following Chemical Formula 1 and a carbon precursor;

the iron source including a carbon source comprising a compound represented by the following Chemical Formula 5;

optionally pulverizing the positive active material precursor for a rechargeable lithium battery; and heat-treating the mixed positive active material precursor for a rechargeable lithium battery:

$$Li_{1+a}Fe_{1-x}M_x(PO_{4-b})X_{b-z}C_pH_qO_r,$$ [Chemical Formula 1]

M being selected from Al, Mg, Ni, Co, Mn, Ti, Ga, Cu, V, Nb, Zr, Ce, In, Zn, Y, and a combination thereof, X being selected from F, S, N, and a combination thereof, $-0.5 < a \leq 0.5$, $0 \leq x \leq 0.5$, $0 \leq b \leq 0.1$, $1 \leq p \leq 100$, $1 \leq q \leq 100$, $1 \leq r \leq 100$, and $0 \leq z \leq 50$;

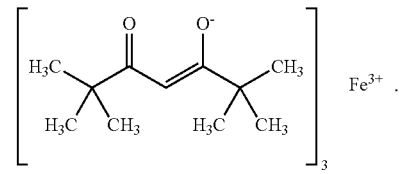
[Chemical Formula 5]

* * * * *